Patented Nov. 19, 1929

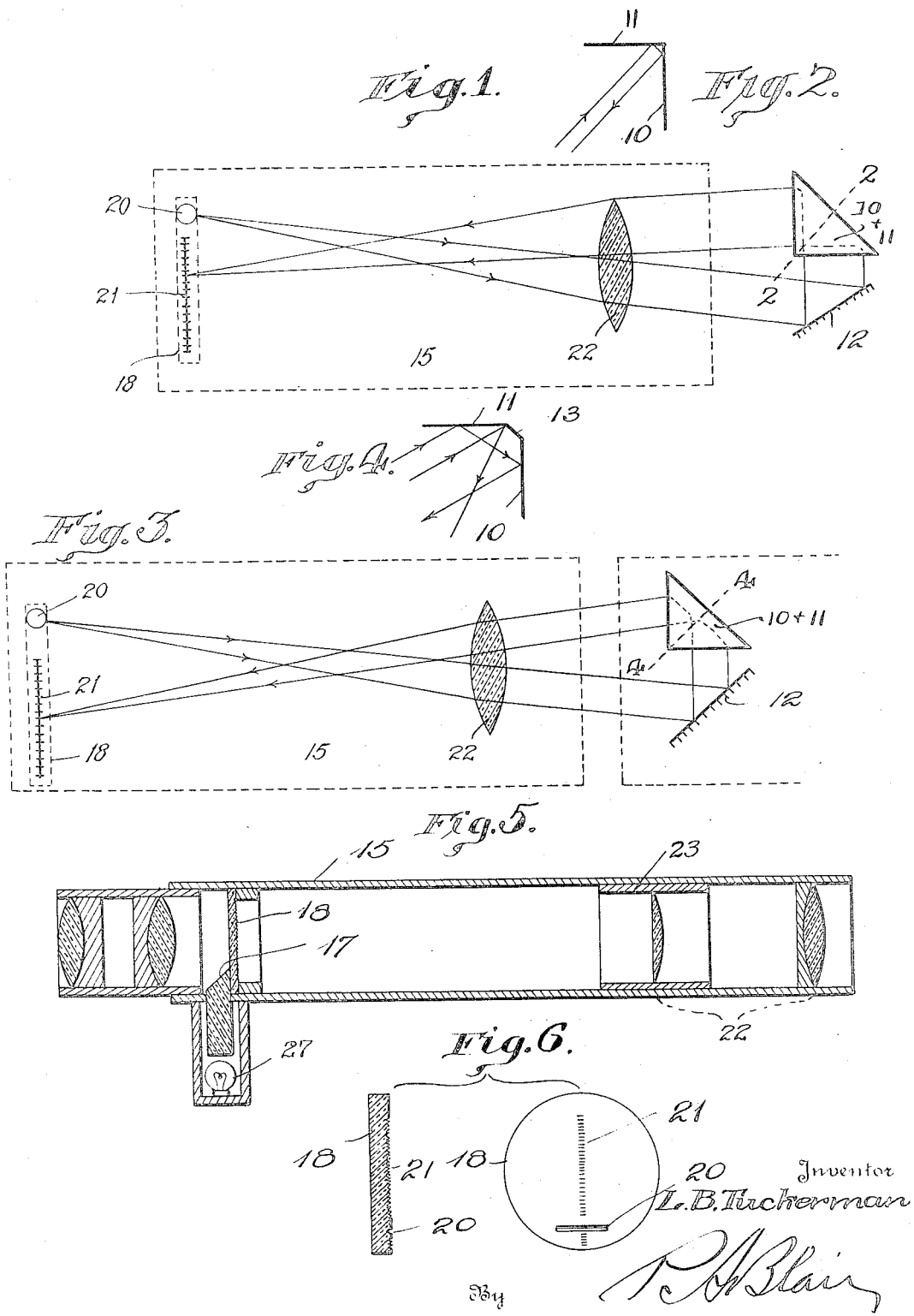

1,736,682

UNITED STATES PATENT OFFICE

LOUIS BRYANT TUCKERMAN, OF WASHINGTON, DISTRICT OF COLUMBIA

OPTICAL LEVER

Application filed October 17, 1923. Serial No. 668,970.

(GRANTED UNDER THE ACT OF MARCH 3, 1883, AS AMENDED APRIL 30, 1928; 370 O. G. 757)

This invention relates to what is known in the art as optical levers, that is, a measuring instrument broadly involving a ray of light reflected on one or more mirrors, prisms, or the like, which ray moves relative to a scale to denote very minute movements of the part to be measured.

Various devices of this general character have been employed heretofore. The single mirror with uncollimated observing system is in common use either as a telescope, mirror and scale or as a lamp, mirror and scale. Within the last few years an auto-collimated observing system has been used either with a single or double mirror system. The collimated observing system has the advantage that the calibration and readings of the instrument are independent of the actual position of the collimator and telescope or the auto-collimator and also of the mirrors, the calibration depending solely on the focal lengths of the lenses and their proper collimation; the reading depending solely on the relative directions (not positions) of collimator and telescope, or auto-collimator and the mirror or mirrors. The double mirror system has the further advantage that the reading is independent of any rotation of the mirror system as a whole about the line of intersection of the two mirrors and depends solely on the angle between the planes of the two mirror surfaces. A rotation of the double mirror system about any axis perpendicular to the line of intersection of the two mirror surfaces moves the reflected ray of light at right angles to the scale through double the angle of rotation. While this does not appreciably alter the reading, alignment in this direction must be carefully made in order to make the reading possible.

All of the devices of this general character heretofore used have necessitated the utmost care to avoid any small change of position of the parts of the device during a series of readings, even small vibrations of the parts caused by accidental jars or by moving machinery frequently destroying the value of the readings or making it impossible to take readings.

It is, therefore, one of the objects of the present invention to provide an improved system or optical lever of simple and practical construction adapted to eliminate the numerous objections heretofore found in instruments of this character.

A further object is to provide a device of the above type which may be readily manufactured and installed and will greatly ease the reading unaffected in any way by vibrations and which will permit the measurement of movement to the smallest degree even to the extent of a few millionths of an inch.

Other objects will be in part obvious and in part hereinafter pointed out in connection with the following analysis of this invention when taken in connection with the accompanying sheets of drawings illustrating one of the various possible embodiments of the present invention.

In the accompanying drawings,—

Figure 1 illustrates diagrammatically one of various possible embodiments showing the complete apparatus, including the auto-collimator and mirror system, Figure 2 is a detail sectional view taken on the line 2/2, Figure 1.

Figure 3, shows a modification of substantially the same apparatus provided with an additional reflecting surface adapted to "give a flash" indication on the observing field of measurement.

Figure 4 is a detail sectional view taken substantially on the line 4/4, Figure 3.

Figure 5 is a sectional elevation of the observing portion or auto-collimator of the mechanism.

Figure 6 illustrates a section and elevation of the reticule, and,

Figure 7:
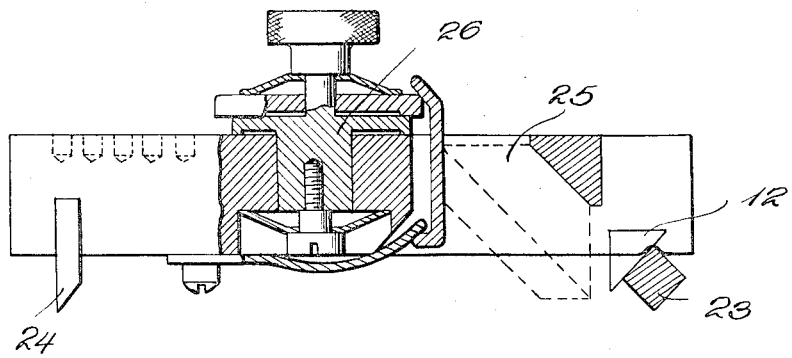
Figure 7 is a partial sectional elevational view of the measuring portion of the system.

The present invention contemplates a new triple or equivalent multiple mirror system in which two mirrors 10 and 11 are fixed together practically at right angles and a third mirror 12 relatively movable is positioned nearly at right angles to these two with its axis of rotation substantially perpendicular to the line of intersection of the fixed pair of mirrors as shown diagrammatically at the right of Figure 1.

While the new mirror system is described in its simplest form, a triple mirror system, it is obvious that many other mirror systems having the same characteristics can be devised. Any mirror system with at least two relatively movable parts having the mirrors so arranged that the light undergoes three or any higher odd number of reflections in passing through the system and in addition having the mirrors oriented so that the emergent light is nearly opposite in direction is optically equivalent to the three mirror system here described. The conditions expressed mathematically are as follows: The quaternion product $$a_1 a_2 a_3 \ldots a_n = \cos \tfrac{1}{2}e + J \sin \tfrac{1}{2}e$$

where $a_1\ a_2, \ldots a_n$ are the unit vector normals to the odd number ($n$, odd) of reflecting surfaces taken in sequence and $e$ is the angle between the incident ray and the revised reflected ray.

For practical working conditions, $$.70 < [Sa_1 a_2 a_3 \ldots a_n] < 1$$

In words. The absolute value of the scaler part of the quaternion product of the unit vector normals to the successive reflecting surfaces taken in order shall be between .70 and 1. In particular the triple mirror system may be combined with any number of additional plane reflecting surfaces in any position whatever without altering the optical character of the system provided both incident and reflected rays are reflected in opposite sequence from each of the additional surfaces. Such auxiliary reflecting surfaces are advantageous in taking observations in inaccessible positions. By properly arranged auxiliary mirrors the observing auto-collimator can be placed in any convenient position.

A reading may be taken from practically any position in front of these three mirrors through the observing telescope shown in Figure 5 and the image of a fiduciary mark in the observing field is steady even with a vibrating or rotating mirror system or with an unsteady observing system, so that if desired readings may be taken with the auto-collimator held free in the hand without the use of any steadying support.

There is, of course a cosine error, due to deviations of the axis of the auto-collimator from the plane determined by the intersection of the two relatively fixed mirrors and the normal to the third mirror. This could be eliminated as in the case of the sextant by swinging the instrument to a maximum reading but another system as illustrated in Figure 3 has been devised and found more convenient. This system includes a small auxiliary mirror 13 being used to convert the system effectively into a combination of double and triple mirror systems thus producing a flash as the axis of the collimator 15 passes through the proper plane. It will be understood that in Figures 1 and 3 the portion at the left of the figures included in the dotted section indicates the auto-collimator with the eyepiece and illuminating prism omitted. Whenever the flash 16 is within the field of view as illustrated in Figure 8, the deviation from the proper position is so small that the cosine error is negligible.

For use with an auto collimator the mirrors must have very accurately plane surfaces and these are more easily obtained in prisms than in ordinary plane mirrors. These prisms, 12—25 as shown in Figure 7, consist of an ordinary 45° prism and a roof prism modified to give the flash, that is, the peak of the roof is planed to present a very small reflecting surface as indicated at 13.

In Figure 5 there is shown a diagram of the auto-collimator 15 provided with an illuminating lamp 27 and prism 17, the reticule 18 carrying a fiduciary mark 20, with vernier and scale 21 and the objective lens system 22 made in two parts so that by adjusting the part 23 the focal length may be adjusted to a predetermined value. The rulings on the reticule preferably face the objective and the instrument is permanently adjusted to a standard focal length, for example, 25 cm. and the bearing ring of the reticule is accurately machined to focus. By this means the reticules are made interchangeable without the necessity of re-collimation or recalibration.

Figure 8:
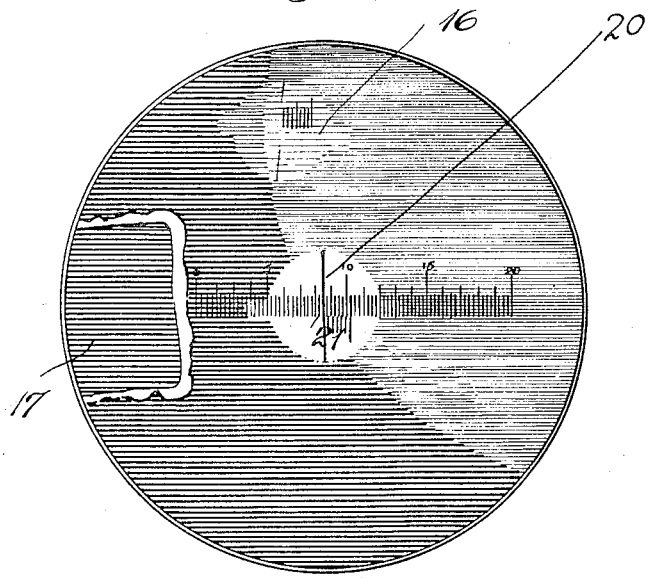
Figure 8 illustrates the view as seen through the auto-collimator.

In Figure 8 wherein is shown the observing field, the flash indicator, fiduciary mark, vernier and scale, the shape of the illuminated area is designed to make alignment of the vernier easy. In connection with the measuring portion of the system shown in Figure 7, with a 0.2″ Martens lozenge 23, one scale division represents 0.00004-in. deformation. Tenths of a division are easily read thus making the instrument readable and accurate to four millionths of an inch. Higher sensibilities could readily be obtained by the use of a higher power autocollimator or a smaller lozenge.

In Figure 7 wherein is shown a sectional elevation of the invention applied to a strain gauge, 24 indicates a knife edge 23, the lozenge carrying the 45° prism 12. 25 is the roof prism which may be adjusted by means of a double cam device 26 with coarse and fine adjustment thereby to bring the fiduciary mark 20 to zero on the scale.

While the present invention is herein described with relation to its application to a strain gauge in which it has been extensively used in investigating the stresses in riveted joints, it is, of course, to be understood that the application of the invention is extremely wide as, for example, it may be used in, galvanometers, electrometers, electrodynamometers, hygrometers, aneroid barometers, rate of climb indicators, sensitive balances, wind tunnel balances, torsion dynamometers, tensiometers, extensometers, compressometers, etc. In general it is applicable wherever it is desired to measure accurately the relative motion of two parts of any instrument, even when the instrument is in rapid motion as in the case of rotating shafts or vibrating bodies.

It will thus be seen that the present invention constitutes a simple and inexpensive apparatus well adapted to accomplish, among others, all of the advantages herein set forth. The system is extremely accurate and unaffected by relative movement within reason of the observing portion or the measuring portion of the system also vibration of either part will not affect the readings so far as accuracy is concerned or materially inconvenience the operator.

Without further analysis, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and, therefore, such adaptations should and are intended to be comprehended within the meaning and range of equivalency of the following claims.

The invention herein described may be manufactured and used by or for the Government of the United States for governmental purposes without the payment to me of any royalty thereon or therefor.

What I claim is:—

1. In an optical lever, in combination, two mirrors relatively fixed and substantially at right angles and a third mirror relatively movable and positioned at substantially right angles to said first mirrors.

2. In an optical lever, in combination, two mirrors relatively fixed and substantially at right angles, a third mirror relatively movable and positioned at substantially right angles to said first mirrors and a collimator for projecting a beam of light on the reflecting surfaces and receiving the reflected beam of light.

3. In an apparatus of the character described, in combination, an observing instrument, a plurality of substantially right angled and relatively movable groups of reflecting surfaces arranged to give a plurality and odd number of reflections, and a collimator for projecting a beam of light on the reflecting surfaces and receiving the reflected beam of light.

4. In an apparatus of the character described, in combination, an observing instrument, reflecting surfaces arranged to give a plurality and odd number of reflections, said reflecting surfaces being in two or more parts relatively movable with respect to each other and a collimator for projecting a beam of light on the reflecting surfaces and receiving the reflected beam of light.

5. In an optical lever of the character set forth having a plurality and odd number of reflecting surfaces, a collimator for projecting a beam of light on the reflecting surfaces and receiving the reflected beam of light, means for adjusting the collimator to a predetermined effective focal length.

6. In an optical lever of the character set forth having a plurality and odd number of reflecting surfaces and a collimator, means for adjusting said collimator to a predetermined effective focal length, and a reticule carried by said collimator having its front surface towards the objective graduated.

7. In an optical lever of the character set forth comprising two mirrors relatively fixed and at substantially right angles to each other, a third mirror at substantially right angles to the first mirrors and an auxiliary reflecting surface carried by said first two mirrors for giving an alternative path for light rays or a flash indication.

8. In an apparatus of the character described, in combination, an observing instrument, a group of reflecting surfaces, a single reflecting surface at substantially right angles to said group, said reflecting surfaces giving a plurality and odd number of reflections, and an auxiliary reflecting surface connected to said plurality of mirrors for giving an alternative path for light rays or a flash indication.

9. In an apparatus of the character described, in combination, an observing instrument, a plurality of substantially right angled reflecting surfaces giving a plurality and odd number of reflections, said reflecting surfaces being in two or more parts relatively movable with respect to each other and an auxiliary reflecting surface intimately connected with said mirrors for giving a flash indication.

10. In an optical lever of the character set forth, a prism having two reflecting surfaces at right angles and a flash indicating reflecting surface in the angle between said reflecting surfaces.

11. In an optical lever, the combination with an observing instrument including a fiduciary point, and a scale, of a reflecting instrument including a plurality of groups of reflecting surfaces, the planes of the surfaces being substantially at right angles to each other.

12. In an optical lever, the combination with an observing instrument including a fiduciary point and a scale, of a reflecting instrument including a plurality of groups of reflecting surfaces, one of said groups being substantially at right angles to the other of said groups.

13. In an optical lever, the combination with an observing instrument including a fiduciary point and a scale, of a reflecting instrument comprising a plurality of groups of reflecting surfaces, the groups being relatively movable with respect to each other, and producing a plurality and odd number of reflections in which the emergent ray for all angles of incidence is substantially opposite in direction to the incident ray.

14. In an optical lever, the combination with an observing instrument including a fiduciary point, a reticule and a scale, of a reflecting instrument comprising a plurality of reflecting surfaces so arranged that a plurality and odd number of reflections will be produced in which the absolute values of the scalar part of the quaternion product of the unit vector normals to the successive reflecting surfaces taken in order shall be .70 and 1., mathematically expressed $$.70 < [Sa_1 a_2 a_3 \ldots a_n] < 1.$$

15. In an optical lever, the combination of a plurality of groups of reflecting surfaces, the groups being relatively movable with respect to each other, and producing a plurality and odd number of reflections in which the emergent ray for all angles of incidence is substantially opposite in direction to the incident ray.

16. In an optical lever, the combination of a plurality of groups of reflecting surfaces relatively movable with respect to one another and so arranged that a plurality and odd number of reflections will be produced in which the absolute values of the scalar part of the quaternion product of the unit vector normals to the successive reflecting surfaces taken in order shall be between .70 and 1., mathematically expressed $$.70 < [Sa_1 a_2 a_3 \ldots a_n] < 1.$$

17. In an apparatus of the character described, in combination, an observing instrument, a plurality of substantially right angled and relatively movable groups of reflecting surfaces arranged to give a plurality and odd number of reflections, and a collimator for projecting a beam of light on the reflecting surfaces.

18. In an apparatus of the character described, in combination, an observing instrument, a plurality of substantially right angled and relatively movable groups of reflecting surfaces arranged to give a plurality and odd number of reflections, and a collimator for receiving a beam of light reflected from the reflecting surfaces.

19. In an apparatus of the character described, in combination, an observing instrument, a plurality of substantially right angled and relatively movable groups of reflecting surfaces arranged to give a plurality and odd number of reflections, a collimator for projecting a beam of light on the reflecting surfaces, and a collimator for receiving a beam of light reflected from the reflecting surfaces.

Signed at Washington, District of Columbia, this 19th day of September, 1923.

LOUIS BRYANT TUCKERMAN.